United States Patent [19]
Kolek

[11] 3,769,126
[45] Oct. 30, 1973

[54] RESINOUS-MICROSPHERE-GLASS FIBER COMPOSITE

[75] Inventor: Robert L. Kolek, Pittsburgh, Pa.

[73] Assignee: Westinghouse Electric Corporation, Pittsburgh, Pa.

[22] Filed: Jan. 30, 1970

[21] Appl. No.: 7,152

[52] U.S. Cl. ............... 156/172, 156/330, 161/162, 161/170, 161/DIG. 5
[51] Int. Cl. ............................................ B32b 31/12
[58] Field of Search ..................... 156/62.2, 51, 169, 156/52, 172, 173, 330, 195; 161/162, 170, DIG. 4, DIG. 5; 117/33, 29, 126; 65/1, 2, 3, 17

[56] References Cited
UNITED STATES PATENTS

| | | | |
|---|---|---|---|
| 3,281,299 | 10/1966 | Shobert | 156/175 |
| 3,425,454 | 2/1969 | Eakins et al. | 65/86 |
| 3,316,139 | 4/1967 | Alford et al. | 161/162 X |
| 3,030,257 | 4/1962 | Whearley et al. | 156/52 |
| 3,412,200 | 11/1968 | Virsberg et al. | 161/162 X |
| 2,885,303 | 5/1959 | Kaplan | 117/33 X |
| 2,806,509 | 9/1957 | Bozzacco et al. | 161/DIG. 4 |
| 3,438,849 | 4/1969 | Isack | 161/170 |

*Primary Examiner*—Carl D. Quarforth
*Assistant Examiner*—E. E. Lehmann
*Attorney*—F. Shapoe and Lee P. Johns

[57] ABSTRACT

A low density, resinous filament-wound composite having fiber glass filaments embedded in a resinous matrix containing hollow glass microspheres whose surface is treated with a viscosity and bond improving agent such as a silane having at least one amino group and which microspheres are present in an amount of up to about 35 weight percent of the composite, whereby the composite has an improved weight-strength ratio.

4 Claims, 8 Drawing Figures

PATENTED OCT 30 1973 3,769,126

WITNESSES
Alfred G. Colaizzi
James F. Young

INVENTOR
Robert L. Kolek
Lee P. Johns
ATTORNEY

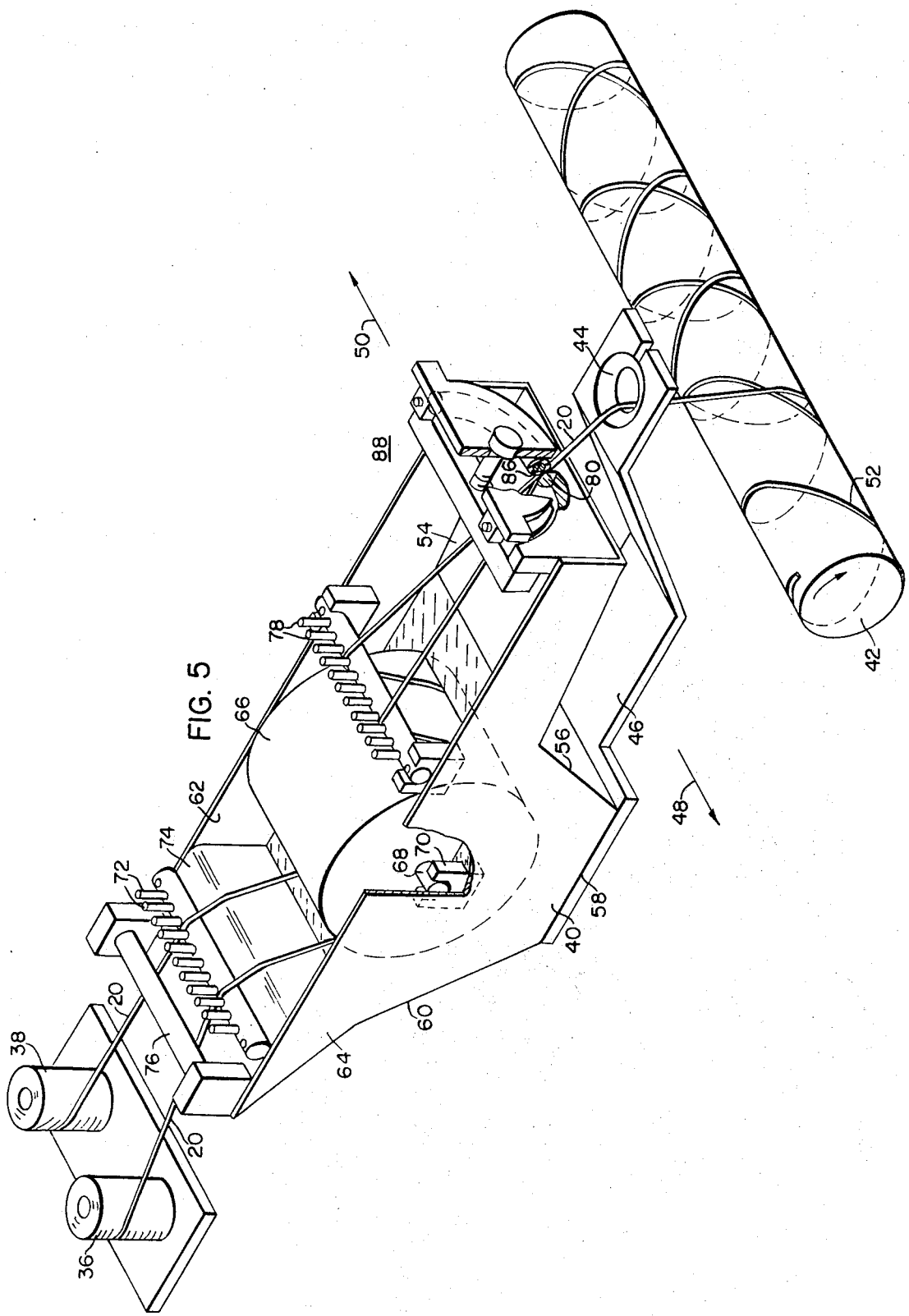

RESINOUS-MICROSPHERE-GLASS FIBER COMPOSITE

BACKGROUND OF THE INVENTION

1. Field of the Invention

This invention relates to a glass fiber filament-wound and resin composite with the resin containing hollow-glass microspheres. In a preferred embodiment, it pertains to a composite having hollow glass fibers and microspheres having a surface treatment for improved bonding with the resin.

2. Description of the Prior Art

There is a growing use of filament-wound glass fiber-resin composite structures such as in rocket cases and storage tanks, which in turn has lead to the consideration of their use for deep submergence applications. Limitations of the composite structures due to density and low stiffness, however, have resulted in the structures having short fatigue life at deep submergence pressures. Although attempts have been made to overcome the fatigue problem by winding thicker structures, the resulting increased weight of such structures, has made them relatively impractical in both performance and economics.

Plastic structures containing fibrous layers and hollow glass microspheres such as disclosed in U.S. Pat. No. 3,316,139, issued Apr. 25, 1967, are limited to flat laminated members or panels comprising bonded layers of glass fiber coated with a permeating resinous binder and hollow microspheres distributed in the binder. The ultimate configuration of such structure may be substantially flat or molded to a desired shape. Where, however, a tubular member is desired, a different technique from that of using externally applied pressure for compressing laminations together for a flat panel such as disclosed in U.S. Pat. No. 3,316,139 is necessary.

Filament winding of resin coated fibers is known in the art. Where the resin however is a mixture of microspheres in a fairly heavy concentration of more than about 20 weight percent of the resin, whereby the microsphere content is sufficiently high to result in a low specific gravity in the final composite product, attempts to wind glass filaments impregnated with such mixture to produce a satisfactory resin impregnated body have proven difficult for various reasons including (1) the difficulty of spreading the fine filaments of the glass fiber sufficiently apart to enable the resin-microsphere mixture to penetrate between them, and (2) the high viscosities of the resin-microsphere mixtures prevent good resin impregnation.

SUMMARY OF THE INVENTION

The term "microspheres" as used herein refers to hollow glass bubbles having an external diameter of less than about 0.01 inch, and with a density of less than 1.

Glass fiber filaments for use in practicing the invention comprise continuous glass filaments which are gathered in threads or strands and then produced in the form of roving, yarn, or the like. The glass filaments may be solid, but as will be set forth hereinafter in detail, the lowest density composite structures have been obtained when the glass filaments are hollow.

In accordance with this invention it has been found that the foregoing problems may be overcome by preliminarily mixing the desired amount of microspheres into the completely reactive liquid thermosettable resinous material, impregnating completely filaments of glass fibers either solid or hollow in a mixture of the resin and microspheres in such a manner that the filaments of glass fibers are spread apart by a minimum of tension to enable the resin-microsphere mixture to penentrate between the filaments. If the resin-microsphere mixture comprises more than about 20 percent by weight of microspheres, then it is necessary to treat the surface with a viscosity reducing agent such as by applying a layer of a silane having at least one amino group on the surfaces of the hollow glass microspheres. The glass fiber filaments coated within resin-microsphere mixture are then wound on a mandrel of a desired configuration, and thereafter the resulting tubular member is cured, as by heating or by applying an electron beam.

This invention also includes an applicator for applying the mixture of the resin and microspheres to the filaments which applicator includes a roller over which a roving of filaments is guided as it is immersed in the liquid resin-microsphere mixture; there being sufficient tension applied to the filaments as they move across the roller to spread the filaments apart to enable the filaments to be individually coated with the resin-sphere mixture after which the filaments are wound upon a mandrel of the desired shape.

The invention is also directed to a composite of a thermoset resinous matrix containing from about 20 to 35 weight percent of hollow glass microspheres, and containing hollow glass fibers, the microspheres having a surface layer of a silane having at least one amino group and surface active agents whereby the composite has an improved weight-strength ratio.

The components of the composite are selected and treated to provide high strength, low density cylindrical and cone shaped structural members. For lowest densities both hollow microspheres and hollow glass fiber filaments are employed. In the past one deterrent to achieving significant density reductions, such as below 1.2 in the composite, has been the difficulty of mixing enough microspheres into the resin without sacrificing the necessary resin viscosity to satisfactorily impregnate the glass fiber filaments. High viscosity prevents integral joining of glass fibers, microsphers, and resin into into a structure where stress transfer is maximized. Where, however, the surfaces of the microspheres are provided with a thin layer of a sizing material by preliminary treating the surfaces with a solution containing a silane, a wetting agent, and a lubricant, the excessively high viscosity of the resin-microsphere mixture is avoided. Moreover, upon subsequent curing, the sizing layer forms a stronger bond between the resin and the microspheres.

BRIEF DESCRIPTION OF THE DRAWINGS

FIG. 5 is a schematic view showing the manner in which the filament is wound on a mandrel;

Similar numerals refer to similar parts throughout the several views of the drawing.

DESCRIPTION OF THE PREFERRED EMBODIMENT

Figure 1:
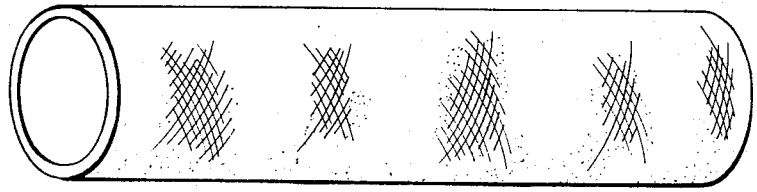
FIG. 1 is a perspective view of a filament wound resinous microsphere-filled tubular member.

In accordance with the invention a tube 10 of low density composite material is shown in FIG. 1. The tube wall may have a thickness of from about 1/16 inch to about one inch, depending upon the strength required. As shown more particularly in FIG. 2, the tube is composed of at least two layers 12 and 13 which for descriptive purposes, are demarcated by a broken line 14. The layers 12 and 13 are composed of a resinous matrix 16, microspheres 18, and roving 20 comprising strands of continuous glass fibers, or filaments.

The roving 20 is applied preferably by winding on a mandrel. Each roving 20 in the layer 12 includes a plurality, such as four strands 22, and is applied with each rotation of the mandrel. Subsequently, the other layer 13 of roving 20 including four strands 24 is wound upon the layer 12. Additional layers may be applied on the outer layer 13. The tube 10 has an inner surface 26 and an outer surface 28. Each strand 22 or 24 is composed of a plurality of fine glass filaments 32 which are illustrated as being hollow. Though the filaments 32 are herein referred to as being glass fibers, they may also be composed of graphite or carbon.

Prior to winding, the rovings 20 are coated with a mixture of the completely reactive liquid thermosettable resinuous material which when cured forms matrix 16, and the microspheres 18. The mixture permeates the spaces between the filaments 32 of glass fiber comprising the roving. More particularly, each roving 20 is comprised of two or more strands 22 or 24 forming each roving. Each strand 22 or 24 is comprised of a plurality of the elongated filaments 32 of glass fibers which in turn are grouped together to form a strand. Each filament 32 may be either a solid or hollow glass fiber or filament, and (in FIG. 2) they are depicted as being hollow. Each filament 32 is preliminarily coated with a mixture of the liquid resin and the microspheres. The viscosity of the resin is preferably between about 200 and 3000 cps. Below 200 cps the resin is too fluid to be retained on the glass fibers in sufficient quantity to provide the desired resinous matrix containing the microspheres. Above 300 cps the resin is too thick to coat the glass fibers uniformly.

Particularly good results have been obtained with liquid epoxy resins. The epoxy resins that may be employed in the matrix of this invention are well known in the art. They are compounds that contain at least one group in which an oxygen atom is attached to adjacent carbon atoms, in an epoxy group

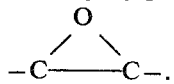

Such compounds are also usually characterized by the presence of terminal hydroxy groups. These resins are further described in U.S. Pat. No. 3,249,412 and the other art referred to therein.

The applied uncured resinous matrix is composed of a liquid completely reactive thermosettable resin such as an epoxy resin. The tube 10 comprises from up to about 50 to 55 weight percent of glass fibers, the balance comprising the mixture of resin and microspheres, of which about 15 to 35 weight percent is microspheres, and the rest is the epoxy resin.

The glass fibers are fine glass filaments which are formed by drawing molten cones of glass at high speed through orifices such as shown in U.S. Pat. No. 2,133,238. A plurality of the glass fiber filaments are subsequently formed into strands of filaments which strands are subsequently grouped together to form a roving.

Some exemplary resin formulations are shown in Table I as follows:

TABLE I

RESIN FORMULATIONS

| | |
|---|---|
| Resin 1 | |
| Epichlorohydrin/bisphenol A epoxy resin (DER-330) | 100 gms |
| Metaphenylene Diamine | 13 gms |
| Hollow glass microspheres (average diameter about 50 microns) | 20 gms |
| Cure | 5 hours at 250°F |
| Resin 2 | |
| Cycloaliphatic epoxy resin (ERL-4221) | 100 gms |
| Boron trifluoride-methyl ethyl amine | 6 gms |
| Hollow glass microspheres (mean diameter about 50 microns) | 20 gms |
| Cure | 2 hrs at 180°F, 4 hrs at 250°F |
| Resin 3 | |
| Homopolymer of Bis-(2,3-Epoxy cyclopentyl) ether (ERLA-4617) | 100 gms |
| Boron trifluoride-methyl ethyl amine | 1.5 gms |
| Metaphenylene Diamine | 23 gms |
| Hollow glass microspheres (mean diameter about 50 microns) | 20 gms |
| Cure | 1/2 hr at 185°F, 1 hr at 250° F, 5 hrs at 320°F |

The resins which are preferably used as matrix material including those set forth in Table I are bisphenol epoxy, cycloaliphatic epoxy, novolak epoxy, and polyester resins. Each of the resins included in Table I has a "stoichiometric" amount of curing agent that will cure it substantially 100 percent depending upon the pot life of the resin. A suitable mixture may consist essentially of from about 5 to 35 parts of microspheres and from about 1 to 15 parts of an epoxy curing agent for each 100 grams of liquid resinous material.

The resin formulations shown in Table I have the physical properties shown in Table II:

TABLE II

CURED RESIN PHYSICAL PROPERTIES

| | DER 330 | ERL-4221 | ERLA-4617 |
|---|---|---|---|
| Tensile (psi) | 14,000 | 13,000 | 18,500 |
| Flexural (psi) | 10,000 | 12,000 | 13,000 |
| Compression (psi) | 17,000 | 21,000 | 19,000 |
| Shear (psi) | 3,200 | 3,000 | 3,500 |
| Hydrostatic Compressive Burst Strength (psi) | 1,700 | 1,800 | 1,700 |
| Density | 1.2 | 1.2 | 1.2 |

As indicated in Table II the density or specific gravity of the listed resins plus 20 percent by weight of microspheres is 1.2

Figure 2:
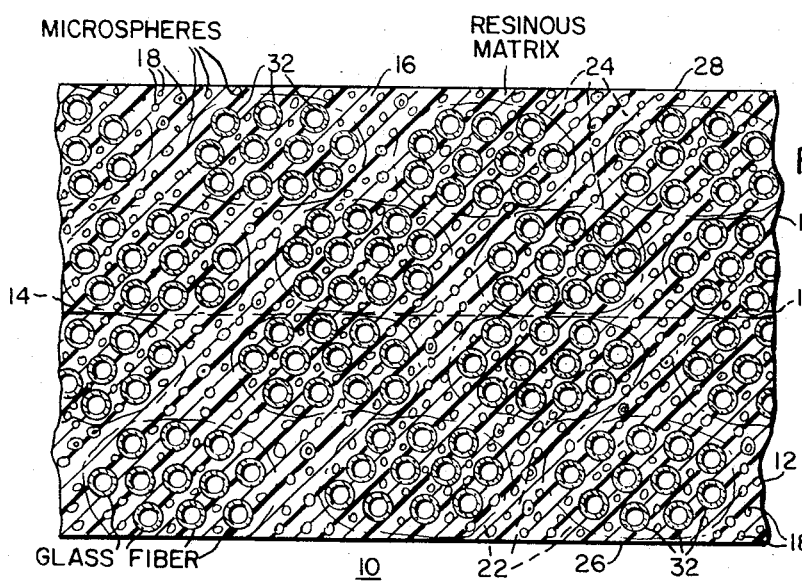
FIG. 2 is an enlarged sectional view showing two layers of plies of glass fibers permeated with resin and hollow microspheres.

As shown in FIG. 2 the microspheres 18 are disposed throughout the entire resinous matrix 16 as well as between the filaments 32. The microspheres 18 are hollow spheres composed of glass having a diameter varying from about 10 to 300 microns, the preferred size of microspheres being an average of from about 40 to 120 microns. The percentage range of microspheres is from about 15 weight percent to about 35 weight percent, the optimum concentration being about 20 to 25 weight percent of microspheres to resin. Higher concentrations of spheres may be used with resins having lower viscosities. The effect of sphere concentration on viscosity of uncured ERL–4221 epoxy resin and specific gravity of the cured resin is shown in Table III:

TABLE III

EFFECT OF SPHERE CONCENTRATION ON VISCOSITY AND SPECIFIC GRAVITY IN ERL-4221 EPOXY RESIN

| % of Spheres by weight of resin | Viscosity at 25°C (cps) | Viscosity at 50°C (cps) | Sp. Gr. of Composite |
|---|---|---|---|
| 0 | 250 | — | 2.1 |
| 5 | 500 | — | 1.9 |
| 10 | 1000 | — | 1.7 |
| 15 | 1500 | — | 1.5 |
| 20 | 2000 | 1600 | 1.2 |
| 25 | 2500 | 2000 | 1.1 |
| 35 | Paste | 2500 | 1.0 |

The viscosity and specific gravity of similar proportions of microspheres in other epoxy resins such as ERL–4617 is closely similar to those given in Table III.

From a processing standpoint the 20 percent by weight concentraon of spheres is the most practical. The effect of sphere concentration on the composite strength by weight percent of resin indicates a significant difference in strength of the composite between 20 and 25 percent. Strengths were lower with 35 percent of microspheres on the resin but not significantly in view of the much lower densities. Resins containing spheres composed of glass and/or silica where the spheres were present at 20 weight percent of the resin were studied and the physical properties are shown in Table IV as follows:

TABLE IV

PHYSICAL PROPERTY COMPARISON OF GLASS VS. SILICA SPHERES

|  | Glass Spheres | Si Spheres |
|---|---|---|
| Tensile (psi) | 18,000 | 31,000 |
| Flexural (psi) | 13,000 | 24,000 |
| Compression (psi) | 19,000 | 12,000 |
| Shear (psi) | 3,500 | 1,300 |
| Hydrostatic Compressive Burst Strength (psi) | 1,800 | 1,400 |
| Specific Gravity | 1.2 | 1.4 |

The specific gravity of the silica and glass spheres is 1.4 and 1.2, respectively. It was found that because of the excessively high viscosity of the resin containing the silica spheres, fewer spheres are coated on the glass roving. Thus, the use of these silica spheres in any commercial fabrication process where density levels of 1.1 to 1.2 are desired, is precluded. The higher value for the tensile and flexural data in Table IV as compared with the glass sphere is due to the presence of more glass fiber in composites containing silica spheres. However, lower compression values for the silica spheres as compared with glass spheres is noted. The mean diameter of silica spheres and glass spheres is 100 microns and 50 microns, respectively.

FABRICATION

The tube 10 may be made in a number of ways including a manual and mechanized steps. One procedure is as follows:
1. Admixing the desired proportions of hollow microspheres into completely reactive liquid thermosetting resinous material;
2. Impregnating glass fiber roving with a mixture of the resinous material containing microspheres;
3. Winding the roving on a mandrel to form a tubular member; and
4. Curing the resin filled reinforced tubular member as by heating or an electron beam.

The foregoing procedure provides a tubular member having glass fiber filaments, and hollow glass microspheres embedded within a resin binder. Although the strength of the resinous matrix is slightly reduced by the addition of the microspheric fillers, a higher load bearing ability and flexural strength for a given weight of the tubular member is achieved because of the increase in the section modulus. In addition, a greater liquid displacement per unit weight is possible and the laminate has a lower density than other conventional glass fiber reinforced members. In most cases, the density of the tubular member 10 is less than that of water, though it can slightly exceed a density of 62.4 pounds per cubic foot.

As shown in FIG. 5, a plurality of spools 36 and 38 of glass fiber rovings 20 are fed through a resin applicator 40. Upon leaving the applicator 40 the roving 20 is wound upon a rotating mandrel 42. For that purpose the mandrel 42 may be part of a conventional filament winding machine, such as the McClean-Anderson W-1 filament winding machine which is manufactured and sold by McClean-Anderson, Inc. The assembly of the applicator and a guide ring 44 is mounted on a base 46 which is movable in opposite directions, as shown by the arrows 48 and 50, at any controlled speed proportional to the speed of rotation of the mandrel 42 so as to provide a widely or closely spaced pattern 52 as shown in FIG. 5. With repeated cycles of rotation the entire mandrel surface is ultimately covered with the roving 20 by the placements of adjacent and off-set bands on the mandrel until a completed tube 10 having a cross-sectional structure such as shown in FIG. 2 is obtained.

Figure 7:
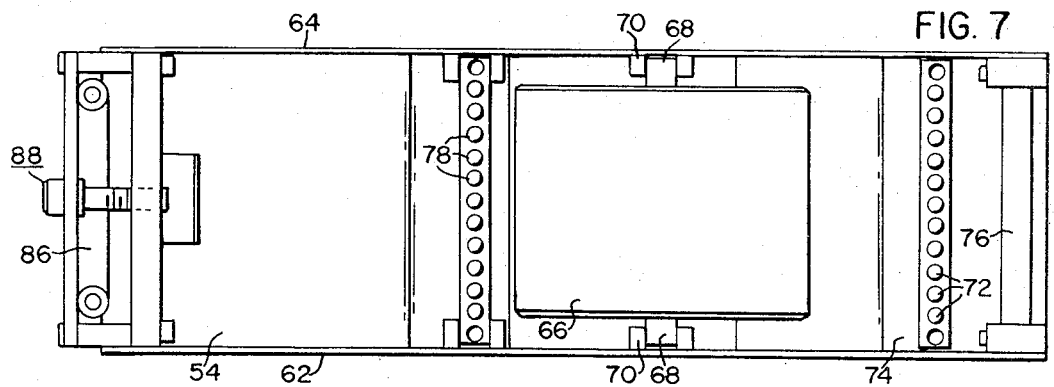
FIG. 7 is a plan view taken on the line IV—IV of FIG. 3.
Figure 6:
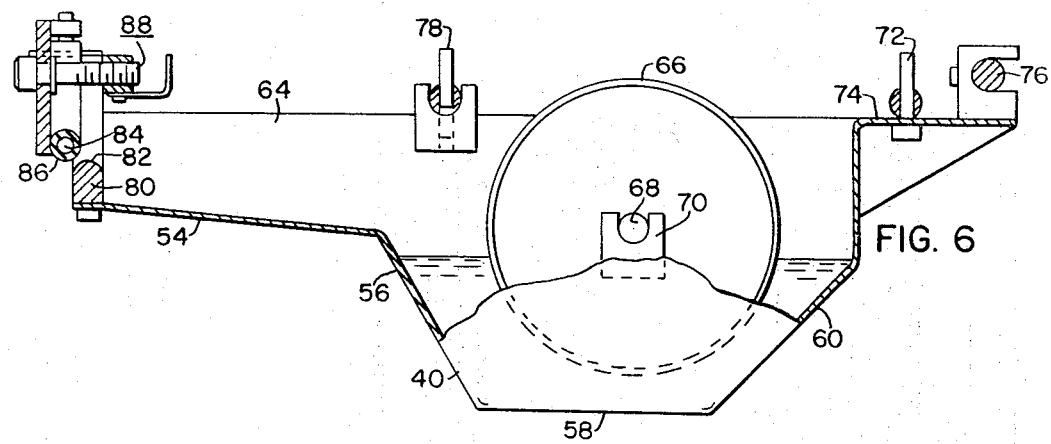
FIG. 6 is a vertical sectional view partly in elevation showing the applicator for applying resin-microsphere mixture to the roving of glass fibers.
Figure 8:
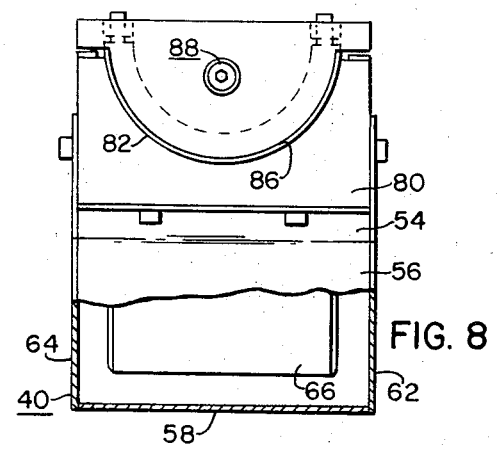
FIG. 8 is an end view taken on the line V—V of FIG. 3.

The applicator is shown more particularly in FIGS. 6, 7, and 8. It includes a bottom wall 54 having portions 56, 58, and 60 forming a pan in which the mixture of resin and 58, and 60 forming a pan in which the mixture of resin and microspheres is disposed. The applicator also includes opposite side walls 62 and 64 which are joined with the bottom wall 54 and wall portions 56–60 in a fluid-tight manner. A roller applicator 66 is disposed in the pan between the walls 62 and 64 where it is rotatably mounted on trunions 68 which are mounted in similar yokes 70 on said walls. A plurality of spaced guide pins 72 are mounted above a flange 74 of the bottom wall 54. A horizontal guide bar 76 is provided behind or to the right of the guide pins 72 as viewed in FIG. 6.

On the other end, of the roller applicator 66 a plurality of guide pins 78 are likewise provided and end plate 80 is provided at the left end of the wall 54, as viewed in FIG. 6, which plate has a U-shaped rounded top surface 82 for loosely guiding the roving out of the applicator 40. An adjusting rod 84 having a coating of resilient material 86, such as a rubber hose, is mounted by adjustable means generally indicated at 88 for moving the coating 86 and from the top surface 82. The top surface 82 and the coating 86 on the rod 84 serve as a wiper for removing excess resin from the roving 20 as it passes there between. Upon leaving the applicator the roving passes through the guide ring 44 and then to the mandrel 42.

The following example is illustrative of the invention:

EXAMPLE

Test samples of glass fiber-reinforced tubes were prepared for hydrostatic compressive burst strength testing embodying the microspheres and compared with otherwise similar tubes having no microspheres present. The tubes were nine inches long and had an ID of 2.605 inch and an OD of 2.970 inch. The resin formulations for the test samples and for the standard filament-wound resin formulation are shown in Table V as follows:

TABLE V

RESIN FORMULATION

| | |
|---|---|
| Epichlorohydrin/bispheral A epoxy resin (Epon 815)* | 100 gms |
| Diethyl amino propylamine | 6 gms |
| Hollow glass microspheres | 20 gms |
| Cure | 2 hrs at 250°F, 4 hrs at 110°F |

*The epoxy equivalent weight is about 175-195 and the molecular weight is 330.

Preparation of the Epon resin 815 including adding microspheres into the resin at a temperature of 120°F in 5 percent increments with slow stirring. The mixture was vacuum degassed. Thereafter the curing agent was added at 120°F and during application of the resin mixture to the roving the temperature was maintained at 120°F. The standard DER-300 resin was prepared without the microspheres and the resin was applied to the roving at room temperature. After preparation, the tube prepared in accordance with the present invention and the standard filament-wound tube were cured as indicated in Table V. The test results are shown in Table VI as follows:

TABLE VI

TEST RESULTS ON CYLINDER WITH EPON 815 AND A CONVENTIONAL CYLINDER

| Cylinder | Epon 815 | Conventional Cylinder |
|---|---|---|
| Tensile (psi) | 18,000 | 50,000 |
| Flexural (psi) | 19,600 | 40,000 |
| Compression (psi) | 10,000 | 70,000 |
| Shear (psi) | 2,400 | 3,800 |
| Hydrostatic Compressive Burst Strength (psi) | 1,000 | 5,000 |
| % Glass Fiber | 50 | 70 |
| % Resin | 36 | 30 |
| % Glass Spheres | 12 | 0 |
| Density | 1.3 | 2.1 |

The data indicates that the tube containing Epon 815 of Table V contained 50 percent glass fibers as compared to 70 percent in the conventional cylinder or tube. The difference is accounted for by volume filled with glass spheres and resin. After several trials it was concluded that about 50 percent was the maximum percentage of glass fibers possible in the Epon 815 cylinder. Cylinders treated with resin containing 20 percent or more of microspheres which contained more than about 50 percent of glass fibers were deficient in or "starved" as to resin as indicated by many uncovered and broken filaments protruding from the surface of the cylinder prior to the tests. The important factor is that the density of the Epon 815 cylinder was much lower than that of the conventional cylinder, namely 1.3 and 2.1, respectively.

Figure 3:
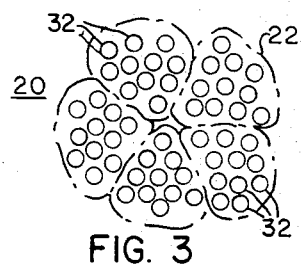
FIG. 3 is an enlarged sectional view to a roving of glass fiber.
Figure 4:
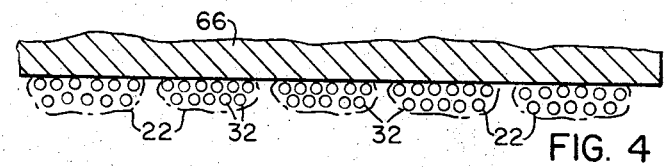
FIG. 4 is a sectional view showing the manner in which the strands comprising the roving are spread apart on the surface of the roller of the applicator during immersion of the roving in the resin-microsphere mixture.

The applicator 40 receives roving 20 from the spools 36 and 38 which roving passes under the guide bar 76 and between space pairs of guide pins 78 from where the roving is fed into the resin bath at zero tension and passes under the roll applicator 66 where it is immersed in the resin (not shown). As the roller applicator 66 rotates, and since minimum tension is applied to the roving 20 the glass filaments 32, being disposed in clustered configuration as shown in FIG. 3 are spread apart as shown in FIG. 4 and the mixture of resin and microspheres penetrates between them to provide a coating on each filament 34. The use of the applicator 40 provides a 50 percent glass fiber content in the test cylinders (to be described hereinbelow) as opposed to a 36 percent content with a conventional bath in which microspheres are not included.

The results of the foregoing example indicate the strength capability of composites containing glass fibers and microspheres as compared to conventionable glass fiber composites containing no microspheres. The former exhibited 70 percent of the strength obtained with conventional composites. Of the 30 percent decrease in strength, 20 percent was attributable to the reduction in glass fiber content. The remaining 10 percent was due to intrinsic strength loss due to the spheres for two unoptimized systems. A comparison of the properties at the start and end of the experiment are indicated in Table VII as follows:

TABLE VII

| | ERL-4221 Optimized Composite | Epon 828 Conventional Glass Fiber Composite |
|---|---|---|
| Tensile (psi) | 44,000 | 50,000 |
| Flexural (psi) | 27,000 | 40,000 |
| Compression (psi) | 40,000 | 70,000 |
| Shear (psi) | 4,200 | 3,800 |
| Compressive Burst Strength (psi) | 3,500 | 5,000 |
| Specific Gravity | 1.2 | 2.1 |

The spread in the properties of tension, flexure, compression, shear, and strength is noted, but the large decrease in specific gravity in the ERL-4221 resin members as compared with the conventional glass fiber composite is apparent.

This invention also contemplates the application of a chemical finish or coating to the surface of the microspheres to increase the strength of glass fiber-resin composites filled with the microspheres. As was indicated above the mixing of hollow glass microspheres into a resin reduces the density of the glass fiber reinforcements from a specific gravity of from about 2.0 to 2.2 to a specific gravity of about 1.2 to 1.4 Further, reduction of the specific gravity below about 1.0 becomes increasingly difficult with additional amounts of microspheres because the viscosity of the resin becomes an increasing problem at such microsphere concentrations necessary to take advantage of their full capability. The high viscosity interfers with the application of the resinous mixture to the glass fibers for efficient fabrication of the composite. However, where the surfaces of the hollow glass microspheres are treated with suitable sizing agents, the bond between the microspheres and the resin is greatly improved and the viscosity of the resin-microsphere mixture is reduced. The sizing agent may be either an aqueous or an organic solution. The agent provides the microspheres with a thin adherent layer of a silane having at least one amino group attached directly to a silicon atom or to a hydrocarbon group having carbon attached to a silicon atom.

The glass microspheres are preferably treated with organo silane, alone or with a surface active wetting agent and a lubricant. Numerous silanes such as used for treating glass fibers may be employed, the silanes usually comprise an alkoxy group and excellent results are obtained with amino silanes wherein the amino group is attached to silicon either directly or through a carbon atom, as through an amino propyl group. Wetting agents are well known for treating glass surfaces. Lubricants such as used for treating glass fibers may be used.

Examples of some solutions are set forth in Table VIII as follows:

TABLE VIII

SIZING AGENT FORMULATIONS

| | % in water |
|---|---|
| Agent 1 | |
| Beta-(3,4-Epoxycyclohexyl)-ethyltrimethoxysilane (Silane A-186) | 0.5 |
| Acid-solublized fatty acid amide (Cirrasol 185A) | 0.1 |
| Octylphenoxyethanol (Triton-100) | 0.1 |
| Agent 2 | |
| N-beta (Aminoethyl)-gamma-aminopropyl-trimethoxysilane (Silane A-1120) | 0.5 |
| Acid-solublized imidazoline (Cation X) | 0.1 |
| Ethylene oxide surfactant (Surfynol 61) | 0.1 |
| Agent 3 | |
| Melamine formaldehyde (Resimene 882) | 1.0 |
| Polyvinyl pyrrolidone (K 30) | 0.3 |
| Ethylene oxide surfactant (Ingepal CA-360) | 0.1 |

The first ingredient of each of the foregoing agents (Silane A-186, Silane A-1120, and Resimene 882) bonds to the glass microsphere surfaces by silica linkage. The second ingredient (e.g. Cirrasol 185A, Cation X, and K30) is a lubricant and the third ingredient (e.g. Triton-100, Surfynol 61, and Ingepal CA-360) is a wetting agent. The second and third ingredients attach themselves to the glass surfaces and thereby lubricate and facilitate mixing the microspheres into the resin and also protect the glass surfaces. The agents enable the resin to wet the sphere surfaces and promote a stronger bond between the resin and microspheres without increasing viscosity appreciably.

Each sizing agent is applied by preliminarily dissolving the appropriate ingredients in water or an organic solvent and immersing the microspheres in the solution for a period of from five to 30 minutes. The microspheres are then filtered out of the solution and dried at a temperature of from about 250°F to 350°F for from eight to 12 hours.

The silanes that may be employed are well known in the art. They are further described in U.S. Pat. Nos. 2,200,815; 2,268,273; 2,355,837; 2,674,619; and 2,267,965.

An example of a filament-wound tube containing 50 percent glass fiber roving and 13 percent of microspheres preliminarily treated with 0.4 weight percent of the Agent 1 (Table VIII) and added to the resin ERL-4221 resulted in the physical properties shown in Table IX:

TABLE IX

| | |
|---|---|
| Tensile (psi) | 44,000 |
| Flexural (psi) | 27,000 |
| Compression (psi) | 41,000 |
| Shear (psi) | 4,200 |
| Hydrostatic Compressive Burst Strength (psi) | 3,500 |
| Sp. Gr. | 1.2 |

The improvement in the several properties listed in Table IX is noted when compared to the same property values for untreated microspheres as listed under the same resin (ERL-4221). The physical property improvement attained with properly treated microspheres is evident.

The physical properties in the foregoing Tables have involved solid glass fibers. The several combinations of solid and hollow microspheres with solid glass fibers have indicated a beneficial reduction of density where hollow microspheres are employed. That is particularly true where the microsphere surfaces are treated.

In order to obtain a fiber reinforced microsphere-filled composite having a density of less than 1.0, the composite is necessarily composed of hollow glass fibers and hollow microspheres. The combination gives a density of less than 1.0 with a minimum sacrifice of strength. Physical properties obtained for hollow glass fiber cylinders as compared to a conventional solid fiber cylinder with and without microspheres treated with Agent 1 in Table VIII are shown in Table X:

TABLE X

HOLLOW FIBERS VS. SOLID FIBERS

| | Solid Fibers No Treated Spheres | Solid Fibers with A-186 Treated Spheres | Hollow Fibers No Treated Spheres | Hollow Fibers with A-186 Treated Spheres |
|---|---|---|---|---|
| Tensile (psi) | 50,000 | 44,000 | 32,000 | 20,000 |
| Flexure (psi) | 40,000 | 27,000 | 28,000 | 16,800 |
| Compression (psi) | 70,000 | 40,000 | 40,000 | 26,000 |
| Shear (psi) | 3,800 | 4,200 | 8,783 | 4,200 |
| Hydrostatic Compressive Burst Strength (psi) | 5,000 | 3,500 | 3,500 | 2,100 |
| Specific Gravity | 2.1 | 1.2 | 1.4 | 0.94 |
| % Glass Fiber | 70 | 50 | 43 | 23 |

Where the hollow fiber cylinder is compared with a solid fiber cylinder on an ultimate strength basis, the two are comparable in strength. The hollow fiber cylinder having a specific gravity density of 0.94 enables a composite with more than twice the thickness of the solid fiber cylinder at reduced weight which has never before been attained. It should give increased stiffness, and dimensional stability that permits the composite to function under strain levels that are not possible with solid, fiber composites. The low den-sity permits a strength/weight ratio that has not been possible in any known glass fiber resin composite.

Various modifications may be made within the spirit of this invention.

What is claimed is:

1. A method for fabricating a low density high strength reinforced glass filament-wound hollow structure by:

a. admixing i. 100 parts of a reactive liquid thermosetting material comprising resin selected from the group consisting of epoxy and polyester resin having a viscosity of between about 200 and 3000 cps at 25°C, and
ii. about 15 to about 35 parts of hollow glass microspheres having a diameter between about 10 and 300 microns, whose outer surface has a layer of viscosity and bond improving agent composed substantially of an organo amino silane compound, to provide a liquid mixture, b. continuously passing strands of filaments of glass fibers through a bath of the liquid mixture of the resinous material and microspheres, and continuously guiding the filaments to contact an applicator with sufficient tension to spread the strands of filaments apart and apply a coating of the mixture on the individual filaments, c. loosely guiding the coated filaments out of the bath, d. winding the coated filaments on a mandrel to form a hollow structure, and e. curing the resin-microsphere glass fiber hollow structure to a thermoset state, to provide a low density structure of glass fibers and about 12 to 35 weight per cent hollow glass microspheres disposed throughout a resin matrix, said structure having a specific gravity of up to about 1.3.

2. The method of claim 1 wherein the resin is epoxy resin, the mixture also contains about 1 to about 15 parts of curing agent, and the structure is a tubular member having up to about 55 percent by weight of glass fibers.

3. The method of claim 1 wherein the filaments are individually coated in step (b) by means of a roller applicator the viscosity and bond improving agent also contains a lubricant and a wetting agent, and the resin-filled member is cured at a temperature between about 110° and 320°F 4. The method of claim 1 wherein the glass fibers are hollow.

* * * * *